United States Patent
Kuntner et al.

(10) Patent No.: US 8,784,023 B2
(45) Date of Patent: Jul. 22, 2014

(54) SCREW AND METHOD TO IDENTIFY THE SCREW

(75) Inventors: Jochen Kuntner, Dornbirn (AT); Peer Schmidt, St. Gallen (CH)

(73) Assignee: Hilti Aktiengesellschaft, Schaan (LI)

( * ) Notice: Subject to any disclaimer, the term of this patent is extended or adjusted under 35 U.S.C. 154(b) by 356 days.

(21) Appl. No.: 13/134,884

(22) Filed: Jun. 20, 2011

(65) Prior Publication Data

US 2011/0316532 A1 Dec. 29, 2011

(30) Foreign Application Priority Data

Jun. 23, 2010 (DE) .................. 10 2010 030 408

(51) Int. Cl.
*F16B 31/02* (2006.01)
*F16B 35/00* (2006.01)
*F16B 35/06* (2006.01)
*G01L 5/24* (2006.01)

(52) U.S. Cl.
CPC .............. *F16B 31/02* (2013.01); *F16B 35/06* (2013.01); *G01L 5/24* (2013.01)
USPC .............................................. 411/8; 411/187

(58) Field of Classification Search
USPC ............ 411/8, 13, 14, 187, 188; 73/761
See application file for complete search history.

(56) References Cited

U.S. PATENT DOCUMENTS

| | | | | |
|---|---|---|---|---|
| 3,750,525 A | * | 8/1973 | Waters et al. | 411/34 |
| 4,498,825 A | * | 2/1985 | Pamer et al. | 411/11 |
| 4,764,066 A | * | 8/1988 | Terrell et al. | 411/187 |
| 5,772,376 A | | 6/1998 | Konig | 411/399 |
| 5,967,721 A | * | 10/1999 | Giachinta et al. | 411/7 |
| 6,843,628 B1 | | 1/2005 | Hoffmeister et al. | 411/14 |
| 6,935,822 B2 | | 8/2005 | Hartmann et al. | 411/161 |
| 6,981,829 B2 | * | 1/2006 | Wilson | 411/1 |
| 7,597,516 B2 | * | 10/2009 | Bucciferro et al. | 411/187 |
| 2006/0051180 A1 | * | 3/2006 | Luthje et al. | 411/14 |

FOREIGN PATENT DOCUMENTS

DE 199 17 222 A1 11/2000
DE 10 205 300 C1 9/2003

* cited by examiner

*Primary Examiner* — Flemming Saether
(74) *Attorney, Agent, or Firm* — Davidson, Davidson & Kappel, LLC

(57) ABSTRACT

A screw has a head whose underside has impressions or embossings and faces towards the tip. The underside is divided into at least five sectors of the same size. Three-fifths of the sectors exhibit an identical pattern of impressions or embossings and at least one sector is provided with a different pattern of impressions or embossings or else with no impressions or embossings.

7 Claims, 2 Drawing Sheets

SCREW AND METHOD TO IDENTIFY THE SCREW

This claims the benefit of German Patent Application DE 10 2010 030 408.5, filed Jun. 23, 2010 and hereby incorporated by reference herein.

BACKGROUND

In the construction sector, screws are put in place using an electric screwdriver. The electric screwdrivers are equipped with an adjustable torque coupler that ends the screwing operation once the torque reaction of the screw exceeds a set target value. Up until now, the user sets the target value on the basis of several attempts. Owing to the wide array of different screws and their properties, an automatic setting of the torque is only possible to a limited extent. Customers tend to reject screws that have been provided with visible markings on the head, especially if the screw heads are going to remain visible after the installation.

SUMMARY OF THE INVENTION

It is an object of the present invention to provide a screw that allows automatic recognition.

The present invention provides a screw with a head whose underside has impressions or embossings and faces towards the tip. The underside is divided into at least five sectors of the same size. Three-fifths of the sectors exhibit an identical pattern of impressions or embossings and at least one sector is provided with a different pattern of impressions or embossings or else with no impressions or embossings. The number of sectors is preferably within the range from five to fifteen.

An identification method according to the invention for a screw comprises the following steps. A magnetic field is generated in the area of a turning screw. The modulation of the magnetic field of the turning screw is detected in the area of the screw head by means of a sensor that is sensitive to magnetic fields. The detected modulation is compared to modulation patterns that are stored in a storage device and that are associated with different screws.

The impressions or embossings are in the form of markings created on the underside. When the screw is turned, the impressions or embossings generate a characteristic modulation of the magnetic susceptibility. A magnetic-field sensor, for instance, with a permanent magnet for generating a magnetic field and with a sensor coil, can detect this modulation. The screw can be recognized on the basis of the frequency spectrum of the modulation. The sectors that have an identical pattern of impressions or embossings and that are rotation-symmetrical with respect to each other contribute to an amplitude at a basic frequency. The basic frequency is prescribed by the rotational speed with which the screw is being turned and by the number of sectors. In addition to the amplitude at the basic frequency, there are also other amplitudes at lower frequencies due to the absence of impressions, that is to say, the sectors that are not rotation-symmetrical. The lower frequencies are integral fractions of the basic frequency, whereby the denominator is the number of sectors. The ratios of the amplitudes and of the frequencies yield a characteristic signature that is largely independent of the rotational speed of the screwdriver, of the absolute strength of the magnetic fields and of the sensitivity of the sensors.

A pattern of two sectors is considered to be identical if they come to coincide when the screw is turned around its axis. The angle by which the screw has to be turned for this purpose is an integral multiple of 360/N degrees, whereby N stands for the number of sectors. In particular, the sectors are considered to be identical if their influence on the spatial magnetic susceptibility is the same. For this purpose, the susceptibility is determined at the height of the screw head at a radial distance from the screw head at a fixed angular position. Washers and structures made of non-magnetizable materials such as, for example, plastic, do not exert any influence.

One embodiment is characterized in that a first impression or embossing is closest to a second impression or embossing in one direction of rotation, and a third impression or embossing is closest to the second impression or embossing counter to the direction of rotation, and in that a first angle between the first impression or embossing and the second impression or embossing is different from a second angle between the second impression or embossing and the third impression or embossing. Here, the first angle can be twice as large as the second angle.

One embodiment provides that two of the impressions or embossings are at a distance from each other at the smallest angle, and each of the impressions or embossings from the first impression or embossing is at a distance that is an integral multiple of the smallest angle. Starting from one impression or embossing, each position of another impression can be reached by repeatedly turning the screw by the smallest angle. The integral multiple is, for example, within the range from 5 to 15.

One embodiment provides that the radial distance between the axis and the impressions or embossings, or at least a section of the impressions or embossings, is larger than two-sixths of the diameter of the screw head. Primarily the impressions or embossings on the edge of the screw are of significance for purposes of recognizing the screw. Other impressions or embossings can be provided for other purposes in an inner area near the axis. These additional impressions or embossings can be arranged with any desired rotational symmetry or else without rotational symmetry.

One embodiment provides that the impressions or embossings are ridges or ribs that run radially.

BRIEF DESCRIPTION OF THE DRAWINGS

The description that follows explains the invention on the basis of embodiments and of figures provided by way of examples. The figures show the following.

Unless otherwise indicated, the same or functionally equivalent elements are designated by the same reference numerals in the figures.

DETAILED DESCRIPTION

Figure 1:
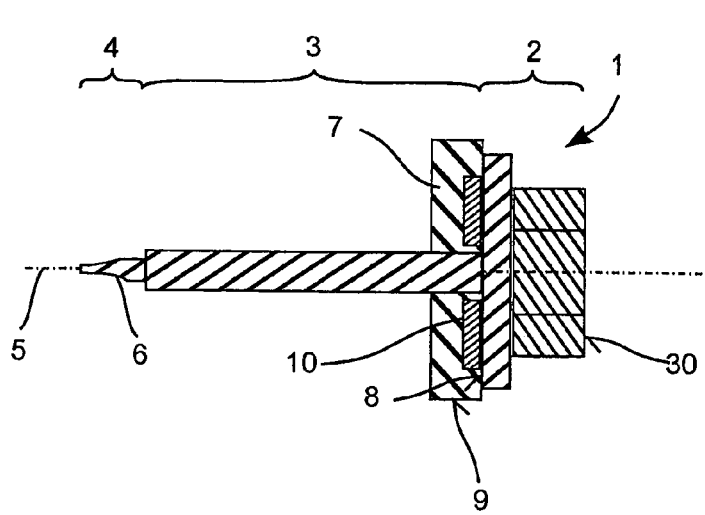
FIG. 1 a screw in a longitudinal section.
Figure 2:
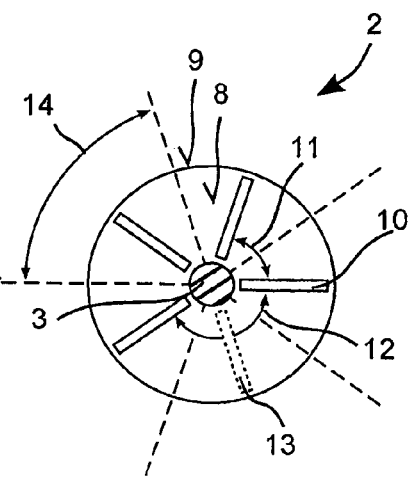
FIG. 2 an underside of the screw from FIG. 1.

FIG. 1 shows a longitudinal section through a structure of a cutting screw 1 by way of an example. FIG. 2 shows the screw 1 in a view from below. The screw 1 has a screw head 2, a thread 3 and a tip 4 along an axis 5. The tip 4 has one or two cutting edges 6 to drill into a metallic workpiece, for instance, a sheet metal plate. The cutting edges 6 can cut into and remove the metal or else deform it in order to create a hole for the thread 3. An optional washer 7 made of an elastic plastic such as, for instance, silicon, can rest against an underside 8 of the screw head 2. The washer 7 can serve as a sealing element in order to seal the hole water-tight.

Four largely identical, radially running ribs 10 projecting in the axial direction are provided on the metallic underside 8 of the screw head 2. As an alternative, the ribs 10 can be formed by depressions pressed into the underside 8. The ribs 10 are preferably made of the same material as the screw head 2, for example, iron, steel or another hard-magnetic or soft-magnetic material. The ribs 10 can be made, for instance, by embossing the underside 8 of the screw head 2. The adjacent ribs 10 are arranged so as to be turned around an axis 5 with respect to each other by an angle 11 of 72° or by an angle 12 of 144°. The largest common divisor of the angles 11, 12 between the ribs 10 is 72°. Each of the ribs 10 can be made to coincide with the other ribs 10 by turning the screw 1 around its axis 5. In this process, the screw 1 is turned by an integral multiple of 72°. Consequently, the underside 8 almost has a rotational symmetry of order five. This symmetry, however, is interrupted by the position 13 without a rib. In each case, three of the four ribs 10 on the screw 1 coincide with another rib 10 when the screw 1 is turned by an integral multiple. One of the ribs 10, however, coincides with the empty position 13.

The underside 8 is divided into five sectors 14 of the same size. The term "same size" is supposed to mean that the inner angle relative to the axis is the same; this is 72° in the example given. The ribs 10 are arranged in four of the sectors 14. The arrangement of the rib 10 is the same in each of the four sectors 14. In the fifth sector 14, no rib 10 is arranged at the position 13 where there is a rib 10 in the other four sectors 14.

Figure 3:
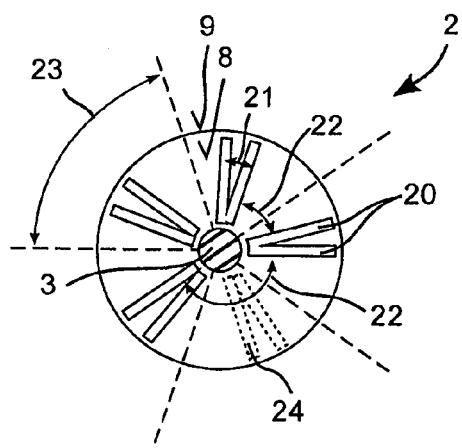
FIG. 3 an alternative underside of the screw.

FIG. 3 shows another embodiment of the underside 8 with four pairs of two ribs 20 each. The ribs 20 within one pair are arranged relative to each other at an angle 21 of 10°. The pairs form a pattern that is repeated multiple times along the circumference. One pair coincides with another pair due to the turning by an angle 22 that equals an integral multiple of 72°. 72° is the largest angle (within the practical range from 0° to 360°) at which such a situation is ensured. When any desired multiple is chosen, at least three of the pairs move into a position that three pairs had assumed before the turning.

The screw could also be turned further by smaller increments, for instance, by 1°, until, at an appropriate integral multiple, namely 72, 144, etc., a pair has reached the position of another pair. With most multiples within the range from 1 to 73, however, the pairs do not come to coincide, but rather, only parts of their structure. With an integral multiple equal to 10, 82, 154, etc., only half of the ribs 20 reach the position of other ribs 20 before the turning.

The underside 8 can be divided into five sectors 23 of the same size. In four of the sectors 23, an identical pattern of the ribs 20 is provided. A fifth sector 23 does not have any ribs at the position 24 where the other four sectors 23 have their ribs 20. As a result, there is an interruption in the five-order symmetry of the underside 8.

Figure 4:
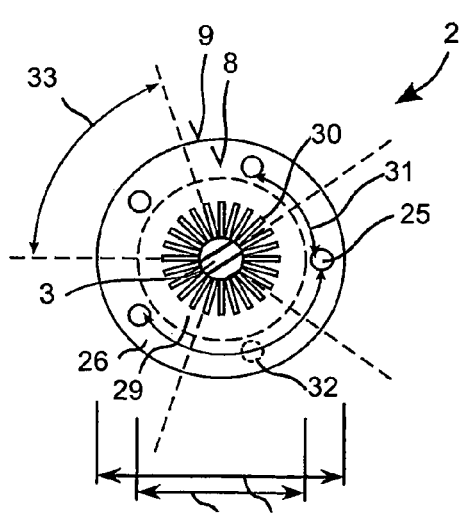
FIG. 4 an alternative underside of the screw.
Figure 5:
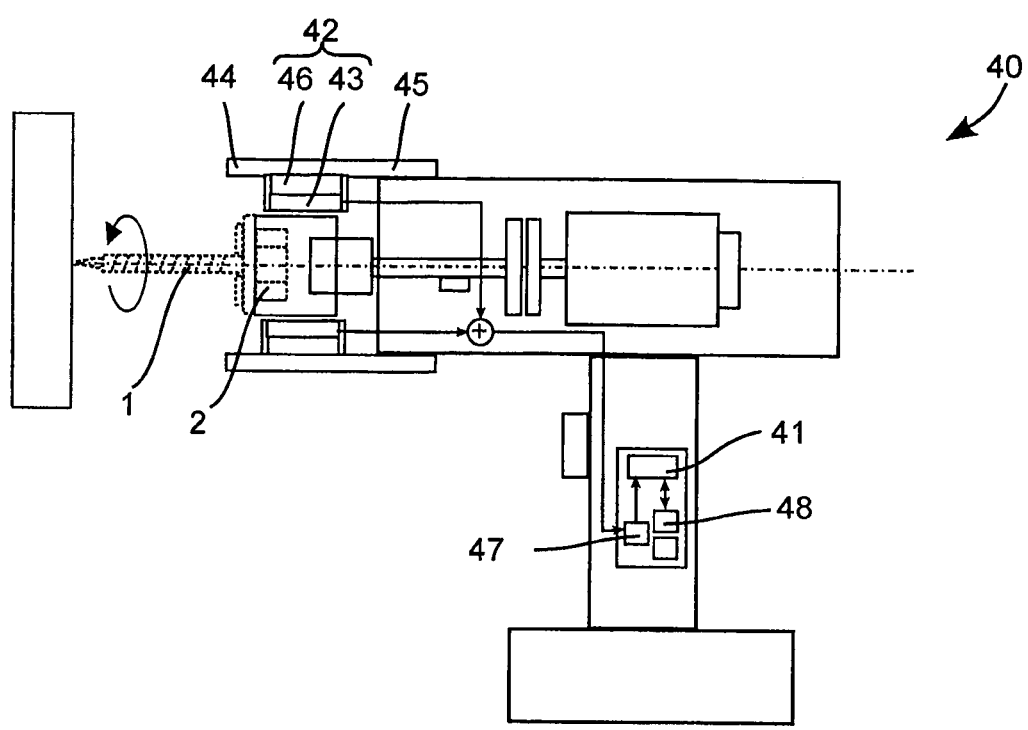
FIG. 5 a screwdriver.

FIG. 4 shows another embodiment of the underside 8. Circular impressions 25 are arranged in an outer ring 26 of the underside 8. The outer ring 26 has, for example, an inner diameter 27 amounting to two-thirds of the diameter 28 of the underside 8. Ribs 30 can be arranged near the axis 3$bz$ in an inner circle 29. The ribs 30 can be provided for many different reasons, for instance, in order to bring about an intermeshing of the underside 8 with a substrate. The impressions 25 in the outer circle 26 are of significance for the embodiment. These impressions are arranged with respect to each other at angular distances 31 with integral multiples of 72°. No impression is provided at a position 32 where the impressions 25 come to be after a rotation by 72°. The underside 8 has five sectors 33 of the same size in which only the outer ring 26 is considered.

Four of the sectors 33 are provided with the same impressions 25, while a fifth sector 33 is without an impression at the position 32.

A screwdriver 40, for example, an electric screwdriver, has a recognition device 41 for the screws 1. The recognition device 41 comprises an active magnetic-field sensor 42 that ascertains a modulation of the magnetic susceptibility in the vicinity of the screw head 2. A sensor element 43 that is sensitive to magnetic fields is arranged along the axis 5 at the height of the screw head 2. The sensor element 43 can be arranged, for example, at a front tool end 44 of a sleeve-shaped depth stop 45 of the screwdriver 40. A permanent magnet 46 of the magnetic-field sensor 42 generates a magnetic field that penetrates the screw head 2. The sensor element 43 detects a modulation of the magnetic field caused by the turned impressions and their influence on the local magnetic susceptibility, for instance, the periodic change of material containing iron and material that is iron-free, especially air and plastic.

The recognition device 41 detects the signals of the sensor element 43$bz$. A spectrum analyzer 47 ascertains which frequencies with a significant amplitude are contained in the signal. Frequencies that are greater than the determined rotational speed of the screw 1 can be blanked out of the frequency spectrum. The frequency spectrum is compared to spectra stored in a data memory 48. The screw types with their appertaining characteristic spectra are stored in this data memory 48.

What is claimed is:

1. A screw comprising:
    a head having an underside, the underside having impressions or embossings, the underside facing towards a screw tip and being divided into at least five sectors of the same size, at least three-fifths of the sectors exhibiting an identical pattern of the impressions or embossings and at least one sector is provided with a different pattern of the impressions embossings or else with no impressions or embossings;
    wherein a first impression or embossing is closest to a second impression or embossing in one direction of rotation, and a third impression or embossing is closest to the second impression or embossing counter to the one direction of rotation, a first angle between the first impression or embossing and the second impression or embossing being different from a second angle between the second impression or embossing and the third impression or embossing, wherein the first angle is twice as large as the second angle.

2. The screw as recited in claim 1 wherein the underside is divided into fifteen sectors at the maximum.

3. The screw as recited in claim 1 wherein two of the impressions or embossings are at a distance from each other at a smallest angle, and each of the impressions or embossings nearest a first impression or embossing being at a distance that is an integral multiple of the smallest angle.

4. The screw as recited in claim 3 wherein each of the impressions or embossings is at a distance from the other impressions or embossings in an integral multiple within the range from five to fifteen of the smallest angle.

5. The screw as recited in claim 1 wherein a radial distance between the axis and the impressions or embossings, or at least a section of the impressions or embossings, is larger than two-sixths of the diameter of the screw head.

6. The screw as recited in claim 1 wherein the impressions or embossings are ridges or ribs that run radially.

7. The screw as recited in claim 1 wherein the screw is divided into five sectors of the same size.

\* \* \* \* \*